UNITED STATES PATENT OFFICE 2,309,457

MANUFACTURE OF CHLORINE DIOXIDE

Willis S. Hutchinson, St. Paul, Minn., and Dale K. Mecham, Albany, Calif., assignors to The Mathieson Alkali Works, Inc., New York, N. Y., a corporation of Virginia No Drawing. Application November 28, 1941, Serial No. 420,813

10 Claims. (Cl. 23—152)

This invention relates to the preparation of chlorine dioxide. It comprehends the production of chlorine dioxide and also the treatment of gaseous mixtures of chlorine dioxide and chlorine whereby the contaminating chlorine gas of the mixture is converted to chlorine dioxide. More particularly, the invention relates to a process whereby chlorine dioxide is produced by the reacting of chlorine gas with a chlorite.

The preparation of chlorine dioxide by reacting chlorine gas with a water-soluble chlorite in aqueous solution has previously been described in United States Patent No. 2,043,284 to Cunningham and Losch. It is an essential of the process therein described that the chlorite be in aqueous solution.

The present invention is based on the discovery that substantially pure chlorine dioxide can be produced by reacting chlorine gas with a chlorite in the solid state and also that chlorine dioxide contaminated with chlorine gas may be purified with respect to chlorine by reacting the contaminating chlorine gas of the mixture with a solid chlorite, thus converting it to chlorine dioxide.

By this invention the necessity of using an aqueous solution of the chlorite is eliminated and the production of substantially pure chlorine dioxide is materially simplified. Included among the advantages of the present invention over previously available methods of producing chlorine dioxide are the following:

1. The moisture content of the chlorine dioxide product is more readily controlled;
2. Corrosion of the generator or reactor and auxiliary equipment is materially reduced;
3. The initial cost and upkeep of the necessary apparatus is substantially reduced;
4. The problem of disposing of the exhausted solid chlorite is simpler than that of disposing of a partially-exhausted chlorite solution which would also contain some chlorine dioxide;
5. On starting the operation, a shorter period is required to reach equilibrium in the chlorine dioxide content of the effluent gases; and
6. On discontinuing the operation, the chlorine and chlorine dioxide gases may be completely stripped from the generator in a shorter time.

In accordance with the present invention, chlorine gas, preferably diluted with an inert gaseous diluent such as air or nitrogen, is brought into contact with a solid chlorite and caused to react therewith to form chlorine dioxide and the corresponding chloride. The exact course of the reaction is not known but quantitatively each mole of chlorine so converted liberates 2 moles of chlorine dioxide with a consumption of 2 moles of an alkali metal chlorite or 1 mole of an alkaline earth chlorite. For example, where (1) sodium chlorite and (2) calcium chlorite, respectively, are used, the overall reaction may be indicated as follows:

(1) $2NaClO_2 + Cl_2 \rightarrow 2ClO_2 + 2NaCl$
(2) $Ca(ClO_2)_2 + Cl_2 \rightarrow 2ClO_2 + CaCl_2$ If undiluted chlorine gas is supplied, substantially undiluted chlorine dioxide is evolved. However, as previously indicated, it is usually preferred to supply the chlorine to the reaction sufficiently diluted with an inert gaseous diluent to reduce the concentration of the chlorine dioxide produced in order to minimize the hazard of handling gaseous chlorine dioxide in high concentration. In this connection, it will be kept in mind that one volume of chlorine will liberate two volumes of chlorine dioxide. Consequently, the molar concentration and partial pressure of the chlorine dioxide in the gaseous mixture leaving the reactor will be twice that of the chlorine in the diluent gas entering the reactor.

In addition to the formation of the chloride by-product, a relatively small proportion of chlorate may also be produced. The chloride and any chlorate formed remain as a residual solid in the reactor. The production of the chloride is an inevitable consequence of the previously indicated reaction. However, the formation of chlorate is generally to be avoided so far as practical as it reduces the efficiency of the process. The dilution of the chlorine gas passed to the reactor with a diluent gas such as air or nitrogen or other gas inert with respect to the chlorine gas, chlorine dioxide, chlorite and chloride, and the consequent lowering of the partial pressure of chlorine dioxide in the effluent gases, has the further advantage of reducing the tendency toward chlorate formation.

It has been found, for example, when operating with a partial pressure of chlorine dioxide in the effluent gases of about 25 millimeters of mercury, only 4% of the chlorite was converted to chlorate. A somewhat higher production of chlorate was obtained with a higher chlorine dioxide partial pressure in the effluent gases, for instance 127 millimeters of mercury, the results being substantially the same in other respects.

Where it is desirable, in view of the purpose for which the chlorine dioxide product is to be used, to produce the chlorine dioxide in a more concentrated form, the amount of diluent gas passed to the reactor in admixture with the chlorine may be reduced with the consequent increase in partial pressure of the chlorine dioxide in the effluent gases. However, when practical, it is preferable to operate at low partial pressures, both from the standpoint of safety and reduced chlorate production.

Excellent results have been obtained where the chlorine mixture supplied to the reactor contained as low as about 2 to 10% chlorine by volume and the inert diluent consisted of air.

The reaction may be effected at normal temperatures by bringing the chlorine gas or a gaseous mixture containing chlorine at substantially atmospheric pressure into contact with the chlorite preferably in a flaked or finely divided condition. The chlorine or chlorine mixture may be substantially dry, if desired, or may contain a normal proportion of water vapor. Similarly, the chlorite may be substantially anhydrous or may be used in the commercial form containing, say, about 5% of the moisture.

The process may be carried out as a batch operation whereby a quantity of the chlorine gas or gaseous chlorine mixture is maintained in contact with the solid chlorite until the reaction is completed or as a continuous operation whereby the chlorine gas or gaseous mixture is continuously passed in contact with the solid chlorite. In commercial practice, the continuous operation is usually preferred.

For example, the continuous production of chlorine dioxide free from chlorine may be accomplished by passing the chlorine gas or gaseous mixture preferably upwardly through a bed or column of the solid chlorite to which fresh chlorite is continuously or intermittently supplied so as to cause the chlorine to pass in intimate contact with the chlorite. The fresh chlorite is with advantage introduced into the bed or column in a manner such that the gases pass therethrough in a generally countercurrent direction with respect to the chlorite, i. e. they first contact the partially exhausted chlorite and subsequently contact the fresh chlorite. The solid residue may likewise be continuously or intermittently withdrawn from the treating chamber. An alternate arrangement is to provide a plurality of reactors containing the chlorite and so connected that the gas stream passes through two or more of said reactors in series. When the chlorite in one reactor has become exhausted that reactor may be by-passed and a fresh reactor cut into the line, advantageously at a point in the flow of the gas stream subsequent to any partially exhausted reactors.

The optimum rate of supplying the gas is dependent upon the cross-sectional area and the thickness of the bed or height of the column of chlorite and may readily be determined by analysis of the effluent gases. It should be such that no objectionable amount of unconverted chlorine gas is present in the effluent gases and will also depend upon the limit of chlorine which may be tolerated in the product. By properly adjusting the gas feed rate and supply of fresh chlorite, chlorine dioxide substantially free from chlorine may be continuously produced.

The invention will be further illustrated by the following examples wherein sodium chlorite is used. It will be understood, however, that, in accordance with the improved process, other solid chlorites may be employed.

*Example I*

A ¾ inch, inside diameter, glass tube was filled to a depth of 41 inches with 200 grams of commercial sodium chlorite having the following analysis:

| | Per cent |
|---|---|
| $NaClO_2$ | 82.82 |
| $NaClO_3$ | 5.60 |
| $NaCl$ | 6.04 |
| $Na_2CO_3$ | 0.65 |
| $H_2O$ | 4.89 |

A mixture of air and chlorine containing 9.1% $Cl_2$ by volume was dried by passing it through concentrated sulfuric acid. This dry gaseous mixture at room temperature was then passed upwardly through the solid chlorite at a rate of about 220 cubic centimeters per minute. Analysis of the effluent gases showed no substantial amount of chlorine present therein until about 73% of the chlorite had reacted with the chlorine to form 90 grams of chlorine dioxide. In this run the partial pressure of the chlorine dioxide in the effluent gases was 127 millimeters of mercury and about 16% of the chlorite was converted to chlorate.

*Example II*

A glass tube similar to that used in Example I was filled to a depth of 40.5 inches with 223 grams of the commercial sodium chlorite used in the previous example. A mixture of air and chlorine gas at room temperature containing 1.96% $Cl_2$ by volume, and without being dried, was passed upwardly at the rate of 714 cubic centimeters per minute through the chlorite. The effluent gases were found by analysis to contain no substantial amount of chlorine for 1300 minutes during which period 79% of the chlorite in the tube had reacted with the chlorine to form 108 grams of chlorine dioxide. In this test the partial pressure of the chlorine dioxide in the effluent gases was 28 millimeters of mercury.

*Example III*

An analytical grade of sodium chlorite, having the following analysis:

| | Per cent |
|---|---|
| $NaClO_2$ | 98.07 |
| $NaClO_3$ | .0.36 |
| $NaCl$ | 1.25 |
| $H_2O$ | [1]0.32 |

[1] By difference.

was kept in a desiccator over calcium chloride for three weeks to remove any water present in the salt. A 12 millimeter, inside diameter, glass tube was filled to a depth of 26 centimeters with 28 grams of this dried chlorite. A mixture of air and chlorine at room temperature, containing 5% $Cl_2$ by volume, was dried by bubbling through concentrated sulfuric acid and then passed through the chlorite at a rate between 0.1 and 0.3 gram per minute. Analysis of the effluent gases indicated that no substantial amount of chlorine was present until after 4.45 grams of chlorine dioxide had been evolved by the reaction of 22% of the sodium chlorite with the chlorine.

The percentage of chlorine dioxide present in the effluent gases from the process of the present invention depends largely upon the proportion of diluent gas employed. Under constant operating conditions, the purity of the chlorine dioxide with respect to chlorine gas is remarkably uniform until the chlorite approaches exhaustion, During normal operating conditions, chlorine dioxide may be produced in accordance with this invention having an average purity, on the basis of chlorine dioxide plus chlorine in the effluent gases, in excess of 99% and chlorine dioxide containing no trace of chlorine has been obtained.

This invention is applicable generally to the removal of chlorine from gaseous mixtures by converting the chlorine to chlorine dioxide and, as previously stated, is useful in purifying chlorine dioxide contaminated with chlorine, the chlorine being converted to chlorine dioxide and the chlorine dioxide originally present remaining unchanged. Thus chlorine dioxide, or gaseous mixtures containing chlorine dioxide, substantially free from chlorine, may be prepared from gaseous mixtures of chlorine and chlorine dioxide such as are produced, for example, by reactions between mineral acids and chlorates.

No external application of heat is necessary as chlorine reacts with the solid chlorite at room temperature and no heat need be supplied. The reaction between the chlorine and the chlorite generates a slight amount of heat but the temperature rise during the reaction is small and causes no difficulty in the production of chlorine dioxide by this method.

The invention is of special value in conjunction with bleaching operations involving the use of chlorine dioxide, as in the bleaching of flour for example, in that it provides for safe, convenient and economical production of chlorine dioxide or gaseous mixtures of chlorine dioxide of high purity, particularly with respect to chlorine content.

We claim:

1. The production of chlorine dioxide by reaction between chlorine and a solid chlorite.
2. The production of chlorine dioxide by reaction between chlorine and solid sodium chlorite.
3. The production of chlorine dioxide by reaction between chlorine and solid calcium chlorite.
4. The production of chlorine dioxide by reaction between a solid chlorite and chlorine gas in admixture with a diluent gas which is inert with respect to chlorine, chlorine dioxide and said chlorite.
5. The production of chlorine dioxide by reaction between a solid chlorite and chlorine gas in admixture with a larger proportion of a diluent gas which is inert with respect to chlorine, chlorine dioxide and said chlorite.
6. The production of chlorine dioxide by reaction between a solid chlorite and a chlorine gas in admixture with a diluent gas which is inert with respect to chlorine, chlorine dioxide and said chlorite, the chlorine gas constituting about 2–10% of a gaseous mixture by volume.
7. The purification of chlorine dioxide with respect to chlorine by reaction between the contaminating chlorine gas and a solid chlorite.
8. The purification of chlorine dioxide with respect to chlorine by reaction between the contaminating chlorine gas and solid sodium chlorite.
9. The purification of chlorine dioxide with respect to chlorine by reaction between the contaminating chlorine gas and solid calcium chlorite.
10. A continuous process for the production of chlorine dioxide substantially free from chlorine gas comprising passing a stream of gas containing chlorine in contact with a solid chlorite.

WILLIS S. HUTCHINSON.
DALE K. MECHAM.